United States Patent [19]
Mirza

[11] Patent Number: 5,625,793
[45] Date of Patent: Apr. 29, 1997

[54] AUTOMATIC CACHE BYPASS FOR INSTRUCTIONS EXHIBITING POOR CACHE HIT RATIO

[75] Inventor: Jamshed H. Mirza, Woodstock, N.Y.

[73] Assignee: International Business Machines Corporation, Armonk, N.Y.

[21] Appl. No.: 685,583

[22] Filed: Apr. 15, 1991

[51] Int. Cl.$^6$ .................................................. G06F 12/12
[52] U.S. Cl. ................................................ 395/465; 395/471
[58] Field of Search ................................. 395/425, 400; 364/DIG. 1, 243.41, 243.43

[56] References Cited

U.S. PATENT DOCUMENTS

| | | | |
|---|---|---|---|
| 4,433,374 | 2/1984 | Hanson et al. | 395/465 |
| 4,500,954 | 2/1985 | Duke et al. | 395/465 |
| 4,663,742 | 5/1987 | Andersen et al. | 365/189.04 |
| 4,888,679 | 12/1989 | Fossum et al. | 395/800 |
| 4,937,738 | 6/1990 | Uchiyama et al. | 395/445 |
| 4,942,518 | 7/1990 | Weatherford et al. | 395/800 |
| 4,970,643 | 11/1990 | Cramm | 395/403 |
| 5,014,188 | 5/1991 | Kawamura | 395/403 |

FOREIGN PATENT DOCUMENTS

| | | |
|---|---|---|
| 0398189 | 11/1990 | European Pat. Off. . |
| 0412247 | 2/1991 | European Pat. Off. . |

OTHER PUBLICATIONS

Silberschatz & P.B. Galvin, *Operating System Concepts*, pp. 319–324 (4th ed., Addison–Wesley Publishing Co. (1994).
J. Handy, *The Cache Memory Book*, pp. 55–60 (Academic Press, Inc., 1993).
Clark et al., "Adaptive Data Staging Mechanism in a Virtual Storage System", *IBM Technical Disclosure Bulletin*, vol. 17, No. 1, Jun. 1974, pp. 210–214.

*Primary Examiner*—Tod R. Swann
*Assistant Examiner*—J. Peikari
*Attorney, Agent, or Firm*—Floyd A. Gonzalez; Sean M. McGinn

[57] ABSTRACT

A cache bypass mechanism automatically avoids caching of data for instructions whose data references, for whatever reason, exhibit low cache hit ratio. The mechanism keeps a record of an instruction's behavior in the immediate past, and this record is used to decide whether its future references should be cached or not. If an instruction is experiencing bad cache hit ratio, it is marked as non-cacheable, and its data references are made to bypass the cache. This avoids the additional penalty of unnecessarily fetching the remaining words in the line, reduces the demand on the memory bandwidth, avoids flushing the cache of useful data and, in parallel processing environments, prevents line thrashing. The cache management scheme is automatic and requires no compiler or user intervention.

11 Claims, 3 Drawing Sheets

| PRESENT STATE BONUS | NEXT STATE, NEW BONUS | | |
|---|---|---|---|
| | 'HIT' TO LRL | 'MISS' TO LRL (& MISS IN CH) | HIT TO ANOTHER LINE |
| C,b (>0) | C,B | C,b−1 | C,B |
| C,0 | C,B | NC,0 | C,B |
| NC,0 | C,0 | NC,0 | C,B |

AUTOMATIC CACHE BYPASS FOR INSTRUCTIONS EXHIBITING POOR CACHE HIT RATIO

BACKGROUND OF THE INVENTION

1. Field of the Invention

The present invention generally relates to high performance processors that use hardware managed caches to enhance their performance and, more particularly, to engineering and scientific vector processors, especially those that feed the vector through the cache.

2. Description of the Prior Art

In high performance computers, caches serve to reduce the observed latency to memory. The cache provides a relatively small but very high performance memory very close to the processor. Data from the much larger but slower main memory is automatically staged into the cache by special hardware on a demand basis, typically in units of transfer called "lines" (ranging, for example, from 32 to 256 bytes). If the program running on the computer exhibits good locality of reference, most of the accesses by the processor are satisfied from the cache, and the average memory access time seen by the processor will be very close to that of the cache; e.g., on the order of one to two cycles. Only when the processor does not find the required data in cache does it incur the "cache miss penalty", which is the longer latency to the main memory; e.g., on the order of twenty to forty cycles in computers with short cycle times. For a given cache structure, a program can be characterized by its "cache hit ratio" (CHR) which is the fraction of the accesses that are satisfied from the cache and hence do not suffer the longer latency to main memory.

Given the size of the cache, the structure of the cache has to be decided in terms of line size (in bytes), the number of lines, and the set associativity. Numerous design trade-off considerations go into these decisions. For example, the line size is chosen so that it is sufficiently large since most references are sequential and make efficient use of prefetched data. If the line size is small, it results in more line misses, and hence more miss penalty, for the same amount of data that currently defines the program locality. Further, smaller lines result in more lines in the cache and have cost, complexity and performance implications in the cache directory design.

The line size is chosen so that it is not too large, since that may result in too few lines and hence would restrict over how many disjoint regions the locality of reference may be distributed. Further, if the line size is large, each line miss will bring in a large number of data elements, all of which may not be used during the line's residency in the cache. This results in time and available main memory bandwidth being spent unnecessarily for data that will not be referenced.

The set associativity of the cache is selected to reduce the probability of cache line thrashing situations. Line thrashing occurs when the current locality of reference includes more lines from a congruence class that map into the same set than the level of associativity provided. This results in the lines constantly displacing each other from the cache and thus driving down the CHR. The set associativity, on the other hand, cannot be arbitrarily large since it has a bearing on the cost and complexity or the cache look-up mechanism.

References by an instruction may exhibit poor cache hit ratio for several reasons. For example, the instruction is in a loop and it references the elements of a data structure with a non-unit stride. Classic examples are references to elements along various directions of a multi-dimensional matrix and referencing a single column in a table of data. If the line size is L elements and the stride s is greater than L, each line will fetch L elements, only one of which will be utilized in the immediate future. If the size of the data structure is large and/or there are several other data structures being accessed by other instructions in the loop, these references will tend to flush the cache so that when another element in the same line is referenced, it will already have been displaced. This leads to situations where the cache hit ratio degrades to close to zero and the latency approaches main store access time, resulting in poor performance. Performance is degraded further because of the fact that for each element utilized, the cache mechanism fetches L-1 additional elements that are never referenced while in the cache. This incurs the delay for the additional fetches as well as the deprivation of the available main memory bandwidth from the other processors in the system. Moreover, the increased cache coherence traffic can cause further degradation in all processors in the system.

Another situation which causes poor cache hit ratio is where the instructions in a loop reference several data objects or several areas of the same data object that all fall in the same congruence class. This can occur more often than one may anticipate if the dimensions of the data objects are a power of two. One can expect to see more and more of that since in a parallel processing system, the available processors are typically a power of two. The natural tendency, then, is to have data objects whose dimensions are also a power of two so as to make it easy to partition them across the processors.

Additionally, striding through large data objects in a non-unit stride direction causes not only the particular instruction to experience poor hit ratio, but it can also cause the code surrounding those instructions to suffer. This is because the instructions with bad locality may have flushed the cache of useful data.

SUMMARY OF THE INVENTION

It is therefore an object of the present invention to provide an automatic bypass for instructions which exhibit poor cache hit ratio, thereby avoiding caching of such data with a consequent improvement in performance.

According to the invention, there is provided a heuristic mechanism that avoids the caching of data for instructions whose data references, for whatever reason, exhibit low cache hit ratio. This is done automatically, without any intervention from the programmer or compiler. The mechanism keeps track of the data reference locality of each instruction to decide if it should be made cacheable or non-cacheable. By keeping references made by an instruction exhibiting bad locality out of the cache, the processor does not incur the performance penalty of fetching unnecessary data in the whole line. This, in turn, avoids the inefficient utilization of memory bandwidth as a result of fetching useless data and flushing useful data in the cache. In parallel programming environments, situations that cause line thrashing between multiple processors are reduced by not caching the data for poorly behaved instructions.

The mechanism according to the invention automatically adjusts itself over time, so that some of the references of an instruction will be cached while others will not. This results in keeping as much of the data object in the cache as possible without flushing useful data. Thus, for example, if the instruction is making passes along a non-unit direction of a matrix of data that is much larger than the cache, the scheme will tend to stabilize as much of the matrix in cache as there is available space while keeping the rest out of the cache by not caching references to it. In this way it adjusts to make the best use of the available cache space.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
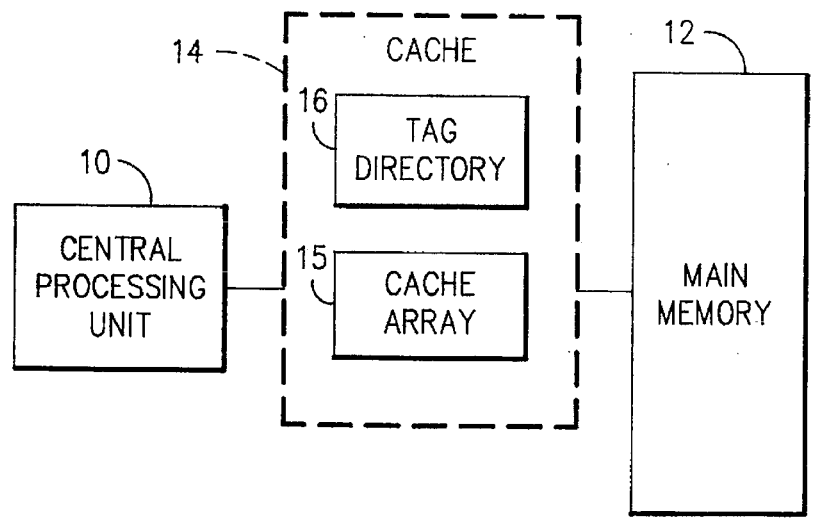
FIG. 1 is a block diagram showing the organization of a memory hierarchy including a cache memory.

Referring now to the drawings, and more particularly to FIG. 1, there is shown a computer memory hierarchy which includes a cache memory. A central processing unit (CPU) 10 processes data stored in main memory 12 according to instructions, also stored in main memory 12. The cache memory 14 is interposed between the CPU 10 and the main memory 12 and is a faster (and typically more expensive) memory than main memory 12 and stores a subset of the data and instructions stored in main memory 12. The concept of using a cache memory is based on the anticipation that data stored in cache memory 14 is likely to be reused and, since the time for the CPU 10 to access the cache memory is shorter than the time for the CPU to access the main memory 12, there is a consequent increase in performance in the computer system. The cache memory 14, or simply "cache", generally comprises an array of high-speed memory devices 15 and a tag directory 16.

When the CPU 10 requests a new word, whether it be data or an instruction, a check is first made in an address tag directory 16 to determine if the word is in the cache memory array 15. If so (i.e., a cache "hit"), the word is read from the cache 14 directly to the CPU 10. If not (i.e., a cache "miss"), the word must be accessed from the main memory 12. Ordinarily, a word read from main memory 12 it written into the cache 14 anticipating that is will be referenced again in the near future. Actually, it is customary to read a block of data containing the word actually referenced rather than just the word itself. This block of data is then written into the cache 14. When a block of data is written into the cache 14, data already in the cache 14 will be overwritten or "flushed". It is therefore necessary to have some type of algorithm based on history of use to identify the least necessary block of data for overwriting. One such algorithm is the Least Recently Used (LRU) algorithm.

According to the invention, an instruction may be in "cacheable" or "non-cacheable" state based on its past behavior. If an instruction generally gets cache hits, it is classified as currently cacheable, and any misses it experiences will result in the whole line being fetched into the cache, on the expectation that the instruction will continue to behave well and will reference the line again. If an instruction generally gets cache misses, it is classified as currently non-cacheable, and the misses it experiences will result in only the required data element being fetched directly from the main memory 12. The line is not fetched into the cache 14 on the expectation that the instruction will continue to behave badly and is unlikely to reference the line again in the near future.

To enhance adaptability to varying situations, the concept of "bonus for good behavior" is introduced. Its function is to provide a threshold for deciding when to switch from cacheable to non-cacheable. Thus, an instruction that experiences cache hits is given a "bonus" of some fixed or, in an adaptive variation, variable value B. If an instruction is cacheable and currently has a bonus of "b", up to b consecutive line misses will be tolerated for its past "good behavior"; that is, it will remain in cacheable state for the next b consecutive misses. If there are more than b consecutive misses, the instruction will move into the non-cacheable state on the (b+1)th miss.

The fixed bonus parameter B could be a system selected value, or it may be a tuning parameter that can be specified for each job or made to vary within a job. The effect of the bonus parameter B is discussed below.

Figure 2:
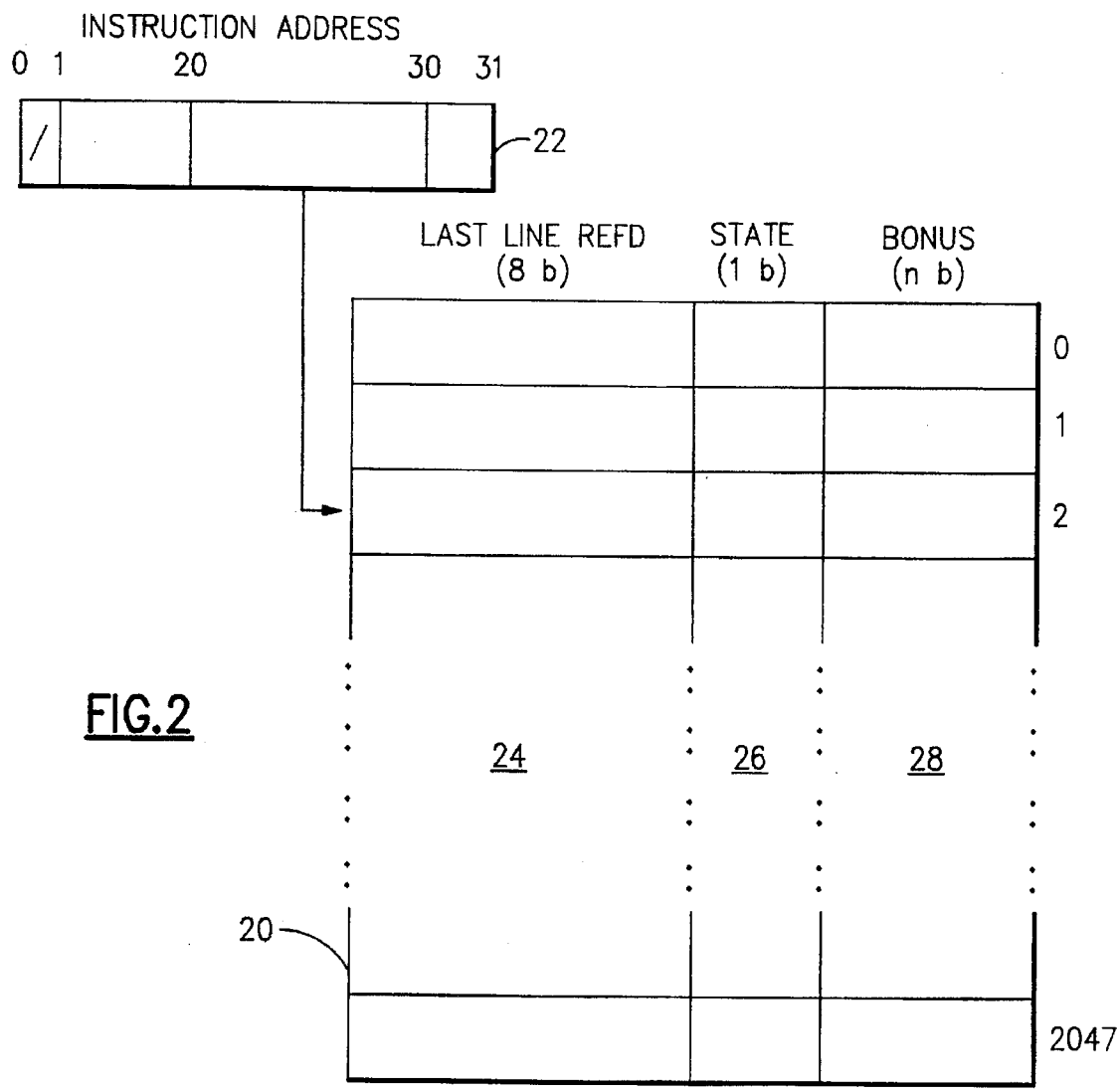
FIG. 2 is a block diagram showing a reference history table structure according to the present invention.

A reference history table (RHT) 20, as shown in FIG. 2, is provided in the CPU 10 according to the invention. The RHT 20 is addressed by an instruction address in register 22 in the CPU. The structure shown in FIG. 2 is specific to the IBM System/370-XA (extended architecture) processors unsofar as the number of bits (32) of the instruction address that is used to address the RHT 20. It will be understood by those skilled in the art that the structure can be trivially adjusted for different processor architectures. For more information on the IBM System/370 (S/370), reference may be had to IBM System/370, Principles of Operation, IBM Publication No. GA22-7000-10 (1987).

To stabilize large instruction loops, the RHT 20 needs to be only about 1K to 2K elements long. The RHT 20 is directly mapped using the instruction address in register 22. Keeping in mind that S/370 instructions can only lie on halfword boundaries, for a 2K entry RHT, bits 20–30 of the instruction address are used to index into the RHT 20. Assuming that there is roughly an equal mix of 2-byte and 4-byte instructions, a 2K entry RHT will stabilize loops of around 1300 instructions.

Each entry of the RHT 20 consists of three fields: the last referenced line address (LRLA) field 24, the STATE field 26 and the BONUS field 28.

The Last Referenced Line Address (LRLA) field 24 contains the address of the last line referenced by the instruction. For S/370-XA and cache line size of 128 bytes, the LRLA field can be a maximum of 24 bits long. However, the scheme will work as well if only the least significant six to ten bits of the line address are saved. This is enough to reduce the probability of two consecutively referenced lines having the same six to ten least significant address bits to near zero. Further, a false match because of comparing only a few bits merely results in the caching of a few additional lines that normally would have been bypassed.

The State field 26 contains the current state of the instruction. The state provides information about how the referenced data is to be treated, cached or non-cached; i.e., bring the whole line into cache or bypass the cache and access the referenced data element directly from main memory. The instruction's past behavior is mapped into one of two basic states. The State field 26 is one bit long.

The Bonus field 28 contains the current value of the bonus associated with an instruction's past "good behavior" (line hits). In the RHT diagram, the bonus field is shown to be n bits, where n can be from 0 to $\log_2(S)$ bits, where S is the total number of lines in the cache. The state diagram shown in FIG. 3 explains how the value of the bonus is manipulated.

An instruction's past behavior is mapped into one of two primary states, cacheable or non-cacheable. State "0" is for instructions that have exhibited good reference locality. Data for instructions in state "0" is cached. An instruction in state "0" can have a current bonus value from 0 to B, inclusive. State "1" is for instructions that have exhibited poor reference locality. Data for instructions in state "1" is not cached. Only the referenced data element is directly fetched from main memory, bypassing the cache completely. Instructions in state "1" have a bonus value of zero at all times. A variation of the bypass scheme, discussed below, introduces a concept of a fixed "penalty" associated with instructions in state "1".

Figures 3, 4:
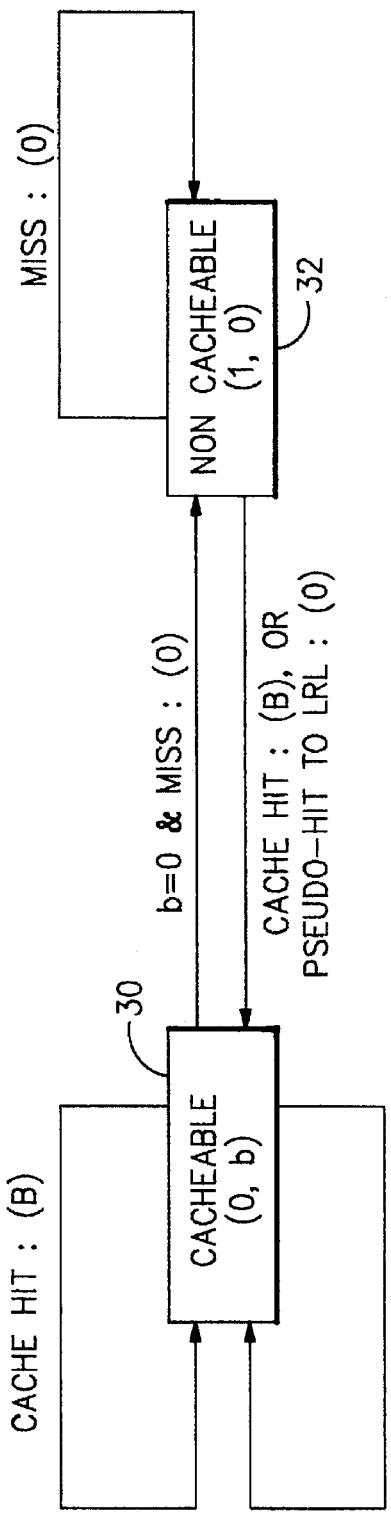
FIG. 3 is a state transition diagram illustrating the operation of the invention.
FIG. 4 is a state table showing the states represented by the state transition diagram of FIG. 3.

The two states are explained in more detail below with reference to FIGS. 2 and 3. In the cacheable state 30 (S=0), an instruction has been behaving well. Its previous references have been hits to lines in cache 14. Every time an instruction in the cacheable state 30 gets a line hit, its bonus value is reset to B. If an instruction in the cacheable state 32 gets a line miss and the current value of the bonus, b, is greater than zero, the instruction remains in the cacheable state but with the bonus reduced by one to b−1. If an instruction in the cacheable state 30 gets a line miss and the current value of the bonus, b, is equal to zero, implying that the instruction has experienced B consecutive line misses, the instruction will move into the non-cacheable state 32 (S=1), with a bonus of zero. These rules are summarized by the first two rows of the table in FIG. 4, where "C" means cacheable and "NC" means non-cacheable.

An instruction in the non-cacheable state 32 has exhibited poor data reference locality in the immediate past. Its last B or more references have been to different lines, and they were not found in cache. As long as it does not reference the same line twice in succession or it does not reference a line already in cache, the instruction will remain in state 32 with a bonus of zero. Should its next reference be to the previously referenced line, whose address is in the LRLA field 24 but will not be a real hit since the line was not fetched into cache 14 during the last reference, it will return to the cacheable state (S=0) with a bonus of zero. This situation is referred to as a "pseudo-hit". Should its next reference be to another line that is already in cache, it moves to the cacheable state 30 (S=0) with a bonus of B. These rules are summarized in the last row of the table shown in FIG. 4.

Figure 5:
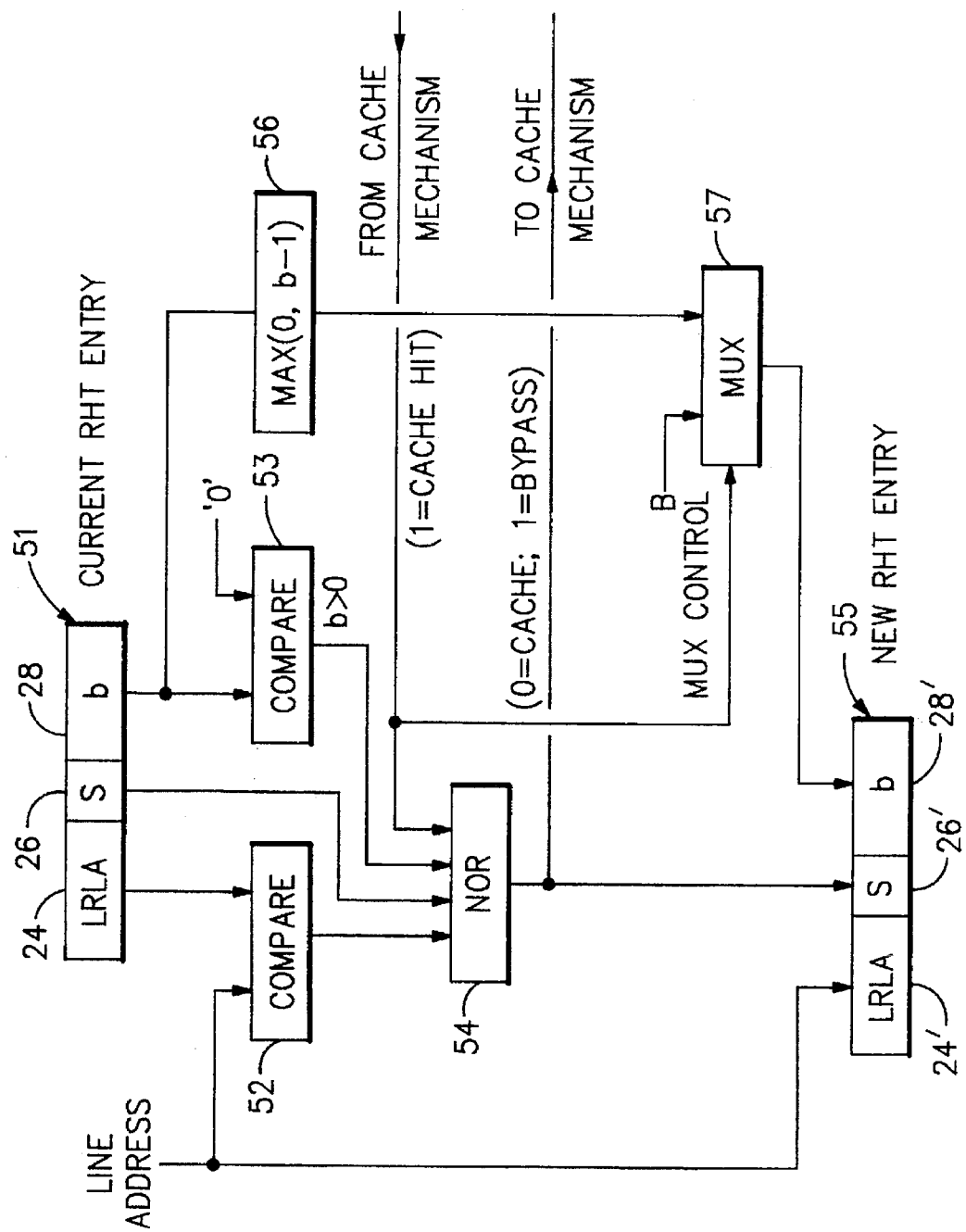
FIG. 5 is a block and logic diagram showing the basic implementation of the automatic cache bypass mechanism according to the invention.

FIG. 5 shows an implementation of the automatic cache bypass mechanism according to the invention. In FIG. 5, LRLA field 24 of the current RHT entry 51 is supplied as one input to comparator 52, the other input to which is the current line address. A match generates a logical "1" at the output of comparator 52. The BONUS field 28 of the current RHT entry 51 is supplied as one input to comparator 53 which determines whether this field is currently greater than zero. If so, the output of comparator 53 is a logical "1". The outputs of the two comparators 52 and 53 are supplied as inputs to NOR gate 54 which also receives as inputs the STATE field 26 and the "hit" output of the cache mechanism (not shown). The normal cache directory look-up takes place in parallel with the RHT lookup and sends a control signal to signal a cache hit or miss.

As is well known, the output of a NOR gate is a logical "1" only when all its inputs are logical "0s". Therefore, a logical "1" from any of the comparators 52 and 53, the state field 26 or a cache hit will result in the output of the NOR gate 54 being a logical "0". The output of the NOR gate 54 is supplied back to the cache mechanism. A logical "0" from the NOR gate 54 causes the cache mechanism to cache the next line, but a logical "1" causes the cache mechanism to bypass the cache. Thus, the automatic cache bypass mechanism according to the invention sends a signal back to the cache mechanism to govern whether the current line is to be cacheable or non-cacheable.

The output of the NOR gate 54 is also supplied to the STATE field 26' of the new RHT entry 55. The LRLA field 24' of the new RHT entry 55 is the current line address. To generate the BONUS field 28' of the new RHT entry 55, the BONUS field 28 of the current RHT entry 51 is supplied to selection circuit 56 which selects either the value of zero or the value (b−1), whichever is greater. The result of this selection is supplied to a multiplexer 57 as one input, the other input to which is the value B. The select input or multiplexer control is the cache hit line. If there is a cache hit (a logical "1") the value B is selected, but if there is a cache miss (a logical "0") the output of the selection circuit 56 is selected.

The RHT array design is determined by the rate of operand address generation. Typically, this rate is one address per cycle. Since each instruction needs a RHT read and write cycle, the RHT should either be implemented of an array that allows simultaneous read/write, or it should be implemented with two or more interleaves.

As long as an instruction makes two or more consecutive references to the same line, the line will always be fetched into the cache, and the cache performance with and without the bypass will be the same. If the current locality of reference within an array is larger than the cache (or the current cache space available to the array in the presence of several competing instructions), the normal cache mechanism will result in zero cache hit for that array, with all the accompanying performance degraders; namely, time spent to fetch the rest of the line, memory bandwidth usurped from other processors, flushing the cache of useful data, and line thrashing situations.

The RHT scheme, on the other hand, would migrate as much of the array into cache as possible, depending on the locality of other instructions, and keep the rest of it out so as to avoid the continuous flushing of the cache. This increases the hit ratio on the part of the array that stabilizes in cache. On the part of the array not in cache, the scheme avoids the additional penalty of fetching the unnecessary words in the line, increases the hit ratio on the rest of the data by not flushing the cache, reduces the bandwidth demand on the memory by fetching only the required word, and avoids line thrashing situations in parallel processing environments. This results in better overall cache hit ratio seen by that instruction than with normal cache mechanism. All this helps to improve the overall system performance.

The Bonus field was introduced as a means of rewarding "good behavior". An instruction that has shown recent good behavior, in the form of cache hits, will be "forgiven" some "bad behavior" (i.e., cache misses) in the future. The value of B will determine how quickly a portion of the data object is stabilized in cache when the referencing characteristics are bad. How much of the data object is stabilized in cache will also be dependent on the referencing characteristics of the other instructions.

Consider first the case where B=1. As long as an instruction is exhibiting bad locality, the RHT scheme does well in keeping the array out of the cache. However, with B=1, the migration of a part of the array into the cache can be very slow, at the rate of one line per row access. Thus, optimal use of the available cache space would not be made.

To speed up the rate at which a portion of the matrix that is being referenced with poor locality can be staged into the cache, a value of B>1 should be used. Selection of the optimal value of B is a trade off between the speed with which array sections are stabilized in cache, in spite of poor referencing characteristics, versus increased cache-to-memory traffic. If B is very large, say B=S where S is the cache size in lines, the RHT mechanism quickly stages in and stabilizes portions of arrays in the cache. However, when the code is working with several arrays with poor referencing patterns, a large value of B can over commit the available cache space. This can result in some non-optimal decisions being made about cacheability and non-cacheability, resulting in slightly increased cache-to-memory traffic than would have occurred with a smaller value of B. On the other hand, if the value of B is too small, the migration and stabilization of portions of the arrays can be slow, resulting in slightly reduced cache hit ratio than if the value of B had been higher. Note however, that in either situation, the effective cache performance with the bypass mechanism, in terms of cache hit ratio, memory bandwidth and memory access time, is better than without it.

Simulation runs show that, in general, when working with several arrays being referenced with poor locality, a value of B around S/4 results in best average overall performance, where S is the size of cache in lines.

The specific implementation shown in FIG. 5 can be modified to better optimize the RHT scheme. For example, rather than having a fixed bonus value B, it can be dynamically selected based on overall cache-miss activity. If the cache miss activity can be monitored, the value of B can be selected based on how many instructions are currently experiencing bad reference characteristics. The value of B can be increased when there are few such instructions and reduced when there are many. This allows a more dynamic trade-off between the speed with which portions of data objects currently exhibiting bad reference characteristics are stabilized in cache and the overall cache-memory traffic.

In addition, in the basic RHT scheme, once an instruction enters the non-cacheable state, it remains in that state as long as it continues to experience repeated cache misses. A variation on that uses the concept of a limited penalty time. Once an instruction is marked as non-cacheable, it remains so for at most "M" subsequent executions. After that, it automatically moves to state C.m. M and m are additional tuning parameters that allow us to fine-tune the performance of the cache.

Thus, while the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. In a computer system including a main memory, a processor requesting data from said main memory, and a cache interposed between said processor and said main memory and storing a subset of data in said main memory, an automatic cache bypass mechanism for instructions exhibiting poor cache hit ratio comprising:

cache control means for determining if requested data is in the cache thereby signifying a cache hit, and if so, retrieving the requested data from the cache, but otherwise, retrieving the requested data from said main memory;

table means addressed by an instruction address from said processor for keeping a record of last referenced line addresses and a status of cacheable or noncacheable based on a history of cache hits or misses and for storing a bonus value for cache hits, said bonus value being related to a number of cache hits of said last referenced line addresses and providing a threshold for determining when to switch said last referenced line addresses from a status of cacheable to noncacheable;

means responsive to said cache control means and said table means for storing data retrieved from said main memory into said cache when a current status for the data as recorded in said table means is cacheable and for bypassing said cache when said current status is noncacheable, said cache being bypassed when a number of cache misses for the requested data exceeds the bonus value; and means for changing the status of data as recorded in said table means as a function of cache hits and said bonus value.

2. The automatic cache bypass mechanism recited in claim 1 further comprising:

means for assigning an initial bonus value to data with a status of cacheable when first storing data in said cache; and means for modifying said bonus value as a function of cache hits or cache misses for said data.

3. The automatic cache bypass mechanism recited in claim 2 wherein said means for modifying said bonus value reduces the recorded bonus value for each cache miss and said means for changing the status of data changes a status of cacheable, as recorded in said table means, to noncacheable on a cache miss when said bonus value is zero.

4. The automatic cache bypass mechanism recited in claim 3 wherein said means for changing the status of data changes a status of noncacheable, as recorded in said table means, to cacheable on a cache hit, said bonus value remaining zero.

5. The automatic cache bypass mechanism recited in claim 4 wherein said bonus value is a tuning parameter which is determined prior to a running of a program on said computer system.

6. The automatic cache bypass mechanism recited in claim 4 wherein said bonus value is a tuning parameter which is predefined within a program running on said computer system.

7. The automatic cache bypass mechanism recited in claim 4 wherein said cache comprises S lines and said bonus value is around S/4.

8. The automatic cache bypass mechanism recited in claim 4 wherein said bonus value is a tuning parameter which is dynamically varied as a function of cache-miss activity.

9. The automatic cache bypass mechanism recited in claim 1 wherein said means responsive to said cache control means and said table means for storing data in said cache comprises:

means for reading out of said table means said status and bonus value for a line addressed by an instruction address from said processor;

comparator means for determining whether said bonus value is greater than zero; and gating means responsive to said status, said comparator means and said cache control means for generating a bypass signal to said cache control means.

10. The automatic cache bypass mechanism recited in claim 9 further comprising:

selector means responsive to said bonus value read out of said table means for selecting the greater of either zero or one less than said bonus value;

multiplexer means having as inputs an output of said selector means and a predefined bonus value, said multiplexer means providing as an output said predefined bonus value when said cache control means indicates a cache hit but said output of said selector means when said cache control means indicates a cache miss; and means for updating the bonus value, as recorded in said table means, with the output of said multiplexer means.

11. The automatic cache bypass mechanism recited in claim 10 wherein said means for changing the status of data, as recorded in said table means, of a line addressed by an instruction address from said processor uses said bypass signal from said gating means to update the status.

* * * * *